US011300397B2

(12) United States Patent
Kim et al.

(10) Patent No.: US 11,300,397 B2
(45) Date of Patent: Apr. 12, 2022

(54) COMPLIANT FORCE SENSING SYSTEM

(71) Applicant: Massachusetts Institute of Technology, Cambridge, MA (US)

(72) Inventors: Sangbae Kim, Brookline, MA (US); Meng Yee Chuah, Cambridge, MA (US); Lindsay Epstein, Cambridge, MA (US); Donghyun Kim, Cambridge, MA (US); Juan Romero, Somerville, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 413 days.

(21) Appl. No.: 16/409,537

(22) Filed: May 10, 2019

(65) Prior Publication Data

US 2020/0300598 A1   Sep. 24, 2020

Related U.S. Application Data

(60) Provisional application No. 62/821,122, filed on Mar. 20, 2019.

(51) Int. Cl.
| | |
|---|---|
| *G01B 5/30* | (2006.01) |
| *B25J 9/16* | (2006.01) |
| *B25J 13/08* | (2006.01) |
| *G01L 5/00* | (2006.01) |

(52) U.S. Cl.
CPC .......... *G01B 5/30* (2013.01); *B25J 9/163* (2013.01); *B25J 13/082* (2013.01); *G01L 5/0052* (2013.01)

(58) Field of Classification Search
None
See application file for complete search history.

(56) References Cited

U.S. PATENT DOCUMENTS

| | | | |
|---|---|---|---|
| 5,092,645 | A | 3/1992 | Okada |
| 5,442,729 | A | 8/1995 | Kramer et al. |
| 2010/0313679 | A1 | 12/2010 | Larkin et al. |
| 2011/0035346 | A1 | 2/2011 | Melkumyan et al. |
| 2012/0152037 | A1 | 6/2012 | Wade |
| 2015/0160773 | A1 | 6/2015 | Bernstein et al. |

OTHER PUBLICATIONS

Chuah et al., Improved Normal and Shear Tactile Force Sensor Performance via Least Squares Artificial Neural Network (LSANN). 2016 IEEE International Conference on Robotics and Automation (ICRA). Stockholm, Sweden. May 16-21, 2016; 116-122.
International Search Report and Written Opinion dated Jul. 29, 2019 in connection with International Application No. PCT/US2019/031771.
PCT/US2019/031771, Jul. 20, 2019, International Search Report and Written Opinion.

*Primary Examiner* — Lisa M Caputo
*Assistant Examiner* — Nigel H Plumb
(74) *Attorney, Agent, or Firm* — Wolf, Greenfield & Sacks, P.C.

(57) ABSTRACT

Sensing systems as well as their methods of operation and training are described. In some embodiments, a sensing system may include a compliant contact pad configured to contact an environment, and a plurality of sensors configured to detect a physical parameter associated with deformation of the compliant contact pad. A processor configured to receive signals from the plurality of sensors may determine a magnitude and direction of a force applied to the compliant contact pad.

22 Claims, 8 Drawing Sheets

COMPLIANT FORCE SENSING SYSTEM

CROSS-REFERENCE TO RELATED APPLICATIONS

This application claims the benefit under 35 U.S.C. § 119(e) of U.S. provisional application Ser. No. 62/821,122, filed Mar. 20, 2019, the disclosure of which is incorporated by reference in its entirety.

FIELD

Disclosed embodiments are related to sensing systems.

BACKGROUND

Many systems use sensors to sense various types of information about their environments. For example, it may be desirable to sense pressures, forces, and/or torques that may be applied to various portions of a system. As such, there are many sensor topologies and sensing modalities available. Some force sensors may utilize strain gauge technology, while others may rely on capacitive techniques. Some force sensors may sense forces applied in a single direction (i.e., single-axis force sensors), while others may sense forces applied in multiple directions (i.e., multi-axis force sensors). In other cases, some sensors may sense both force and torque, such as a six-axis force/torque sensor.

SUMMARY

In one embodiment, a sensing system includes a compliant contact pad and sensors associated with the compliant contact pad. The compliant contact pad is configured to contact an environment. The sensors are configured to detect a physical parameter associated with deformation of the compliant contact pad.

In another embodiment, a method includes applying a force to a compliant contact pad, receiving signals from a plurality of sensors configured to detect a physical parameter associated with deformation of the compliant contact pad, providing the signals to a trained statistical model of the compliant contact pad, and obtaining a corresponding output including a magnitude and direction of the force applied to the compliant contact pad.

In still another embodiment, a method includes obtaining training data, generating a trained statistical model using the training data, and storing the trained statistical model in a non-transitory computer readable medium for subsequent use. The training data include magnitude, direction, and contact location data for forces applied to a compliant contact pad, as well as sensor data from sensors configured to detect a physical parameter associated with deformation of the compliant contact pad when the forces are applied to the compliant contact pad.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
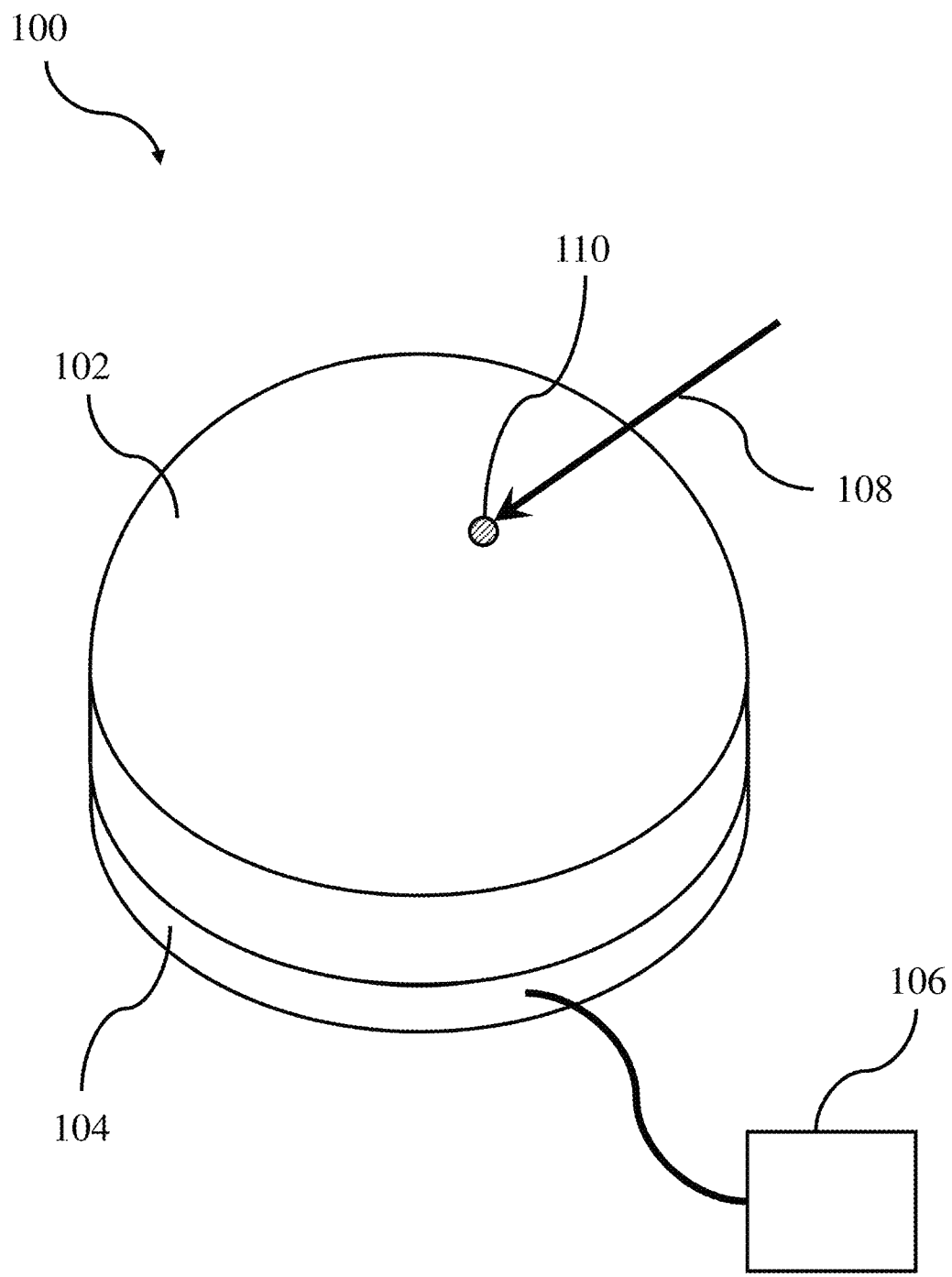
FIG. 1 is a perspective view of one embodiment of a sensing system.

Conventional strain gauge based force/torque sensors may have limited utility for physical interactions that require fast contact or impact. Typical multi-axis force sensors made of high stiffness materials may relate the linear strain of a structure to an output force or torque. While these types of sensors may be very accurate and repeatable, they can cause several problems when used for dynamic physical interactions. First, these sensors may be fragile upon impact due to their high stiffness. Second, these sensors may be inherently sensitive to inertial noise due to their design topology. Third, the sensors may be heavy and expensive.

In view of the above, the Inventors have recognized that in order to reliably provide contact information in dynamic systems, different types of sensors that may be lighter, softer, cheaper, and/or more robust against impacts and abrasion than typical sensing systems may be desirable. Specifically, it may be advantageous to build a lightweight, low cost, yet robust sensing system suitable for use in dynamic systems, such as legged robots undergoing ground locomotion. Such a sensing system may allow for improved shear sensitivity, contact detection, and ground contact location detection compared to existing sensors. Systems involved in dynamic interactions with an environment often experience quasi point contacts with changing contact angles. Therefore, in order to better infer contact details and more accurately estimate allowable contact force range for secure contact, it may also be desirable for sensors to provide both force measurement and contact location measurement simultaneously in some applications.

In view of the limitations of current sensors, the Inventors have recognized the benefits associated with sensing systems configured to sense a magnitude, a direction, and/or a contact location of a force applied to one or more portions of a system due to interactions with a surrounding environment. In some embodiments, it may be desirable for such a sensing system to sense each of these parameters. The contact location may be a contact location on a surface of the sensing system at which the force between a surrounding environment and the sensing system may be applied.

In one embodiment, a sensing system may include a plurality of sensors and a complaint contact pad. The compliant contact pad may be constructed so as to deform mechanically in response to an interaction, such as a contact, with an environment. Generally, interaction with an environment may result in a force being applied to the compliant contact pad at a contact location which induces a deformation in the compliant contact pad. As the compliant contact pad deforms in response to the applied force, the plurality of sensors may sense physical parameters associated with the deformation of the compliant contact pad, and may send signals to a processor related to the sensed deformation. Physical parameters associated with deformation may include stress, strain, displacement, force, pressure, and/or any other quantity that may be sensed by a sensor to indicate deformation. The processor may then determine one or more selected from the group of a magnitude, direction, and contact location of the applied force based at least in part on the signals received from the multiple sensors. Depending on the embodiment, the processor may determine two or more, or each of, the magnitude, direction, and contact location of the applied force.

Without wishing to be bound by theory, the ability of a sensing system to sense a magnitude, direction, and/or contact location of an applied force may be related to the number of sensors included in the sensing system to detect a physical parameter associated with deformation applied to an associated complaint contact pad. Specifically, by sampling a physical parameter associated with deformation of a compliant contact pad at multiple locations, multiple sensors may permit a sensing system to infer multidimensional information about the applied force causing the deformation of the associated complaint contact pad. For example, at least N sensors may be used to determine N degrees of freedom of the applied force, though additional sensors greater than the number of degrees of freedom of the applied force may provide additional accuracy. For example, a plurality of sensors used to detect at least three separate degrees of freedom of the applied deformation may be used to determine a magnitude and direction of an applied force based on the three degrees of freedom associated with the triaxial components (e.g. X, Y, and Z components) of the force. In contrast, to determine each of a magnitude, direction, and location of a force applied to a contact pad, the plurality of sensors may include at least five sensors that detect at least five separate degrees of freedom of the applied deformation. While including additional sensors capable of sensing additional degrees of freedom of the applied deformation may increase an accuracy of the sensing system, the inclusion of these additional sensors may also correspondingly increase the computational cost of the sensing system. Accordingly, the accuracy and computational cost of a sensing system may be balanced against one another when selecting the number of sensors for use in a particular sensing system. For example, the disclosed sensing systems may include between or equal to 3 to 10 sensors, 5 to 10 sensors, and/or any other appropriate number of sensors for a desired sensing application and the number of degrees of freedom being detected as the disclosure is not limited to any specific number of sensors.

In view of the above, it should be understood that sensors used in the embodiments described herein may be single axis and/or multi-axis sensors. However, for purposes of this disclosure, a multi-axis sensor may be considered to be multiple sensors capable of sensing a corresponding number of degrees of freedom of a deformation applied to an associated compliant contact pad. For example, a triaxial force sensor which measures forces in three different directions may be considered to be three separate sensors for purposes of this disclosure.

The choice of a particular sensor type for use in a sensing system may be based at least in part on the type of deformation of a compliant contact pad that may be detected. For example, in some embodiments, a sensing system may detect deformations of a compliant contact pad by detecting changes in a stress state of the compliant contact pad. In such embodiments, pressure sensors may be included in the sensing system to detect the stress state of the compliant contact pad. In other embodiments, changes in a strain state of a compliant contact pad may be detected. In such embodiments, strain gauges may be included in the sensing system. However, it should be understood that the disclosure is not limited with regard to whether a sensing system includes any particular type of sensor for sensing a physical parameter associated with a deformation of a compliant contact pad. For example, a sensing system may include force sensors, pressure sensors, torque sensors, strain gauges, displacement sensors, combinations of the forgoing, and/or any other suitable type of sensor capable of detecting one or more physical parameters associated with a deformation applied to a complaint contact pad.

In some embodiments, a processor may determine a magnitude, direction, and contact location of a force applied to a compliant contact pad using a trained statistical model. In such embodiments, the above noted sensors may detect one or more detectable physical parameters of a deformation applied to the associated compliant contact pad. The sensors may then output a corresponding plurality of signals to an associated processor which may provide the signals to a trained statistical model. The trained statistical model may then determine one or more, or each of, the magnitude, direction, and contact location of the applied force on the compliant contact pad using the provided plurality of signals.

A trained statistical model may relate input states to output states. In a sensing system, the input states may be sensor signals and the output states may be information about an applied force, such as magnitude, direction, and/or contact location data. To train a statistical model, training data relating the applied forces to particular deformation states of a compliant contact pad may be obtained in any appropriate fashion. The training data may include magnitude, direction, and/or contact location data for applied forces, as well as corresponding sensor data from multiple sensors incorporated in a particular sensing system. Thus, the training data may include multiple data points including an associated force with a known magnitude, direction, and/or contact location on a compliant contact pad and corresponding sensor signals obtained from the associated sensors. The obtained training data may be used to train a statistical model which may then be stored in a non-transitory computer readable medium for subsequent usage as detailed herein. While any appropriate type of trained statistical model may be used, in some embodiments the trained statistical model may include a regression method, such as Gaussian process regression, a neural network, such as a radial basis function network or a convolutional neural network, and/or any other appropriate type of trained statistical model as well as any other appropriate type of analytical method as the disclosure is not limited to only using trained statistical models.

As stated above, a sensing system may include a compliant contact pad. In some embodiments, the compliant contact pad may be a portion of the sensing system which is constructed to make contact with a surrounding environment. In some embodiments, a compliant contact pad may be made of a single material (i.e., monolithic). In other embodiments, a compliant contact pad may be made of multiple materials (i.e., a composite). Whether monolithic or composite, the compliant contact pad may be made of one or more compliant materials such as an elastomer, rubber, or any other appropriate compliant material that exhibits sufficient compliance to allow the material to deform to a measurable degree under expected loading conditions for a particular application for which the sensing system may be used. In some embodiments, the Young's modulus of the compliant contact pad may be between or equal to 1 kPa and 700, 1 MPa and 100 MPa, and/or any other appropriate range of Young's moduli. In one specific embodiment, the Young's modulus of the compliant contact pad may be approximately 10 MPa. Of course, while different loading conditions may be expected for different applications, a compliant contact pad may be appropriate constructed with an appropriate shape and material to deform appropriately under expected loading conditions. Appropriate deformation of the compliant contact pad may include deforming enough so that physical parameters associated with the deformation may be detected by multiple sensors of the sensing system, and yet not deforming so much as to either damage the multiple sensors, to saturate the signals of the multiple sensors, and/or to impede the functionality or operation of a system the sensing system is integrated with. Thus, it should be understood the material and/or overall construction of the compliant contact pad may exhibit different compliances for different applications.

In some applications, it may be desirable to create an approximate point contact for interaction between a system and a surrounding environment. Thus, in some embodiments, a compliant contact pad may be shaped and arranged to form an approximate point contact with a surrounding environment with which the compliant contact pad interacts. In some applications, a point contact may be achieved through a combination of a convex surface and a planar surface. As such, in an embodiment where a compliant contact pad may be expected to interact with generally planar surfaces, the compliant contact pad may include a shape that is at least partially convex. For example, at least a portion of the compliant contact pad may be hemispherical or otherwise convex. However, it should be understood that other shapes, including planar, concave, and/or any other appropriate shape, or combination of shapes, may be used for a compliant pad for interacting with an expected environment as the disclosure is not limited to the use of any particular shape.

As noted above, a sensing system may include multiple sensors constructed and arranged to sense physical parameters associated with deformation of an associated compliant contact pad. In such an embodiment, the sensors may be disposed within the compliant contact pad or adjacent to, and in contact with, the compliant contact pad. The sensors may also be disposed at locations that are distinct from a location of the compliant contact pad. That is, the sensors and the compliant contact pad may not be in physical contact. However, regardless of position, the sensors may be configured to detect physical parameters associated with deformations of the compliant contact pad. While the sensors may be located in any appropriate position to detect physical parameters associated with a deformation of an associated complaint contact pad, in some embodiments, sensor positions may be selected based at least in part on concerns such as wiring arrangements or mechanical interfacing.

In some applications, it may be desirable to provide a structure to support a sensing system, provide additional protection to the associated sensors, and/or to interface the sensing system with one or more other associated portions of an overall system. Accordingly, in some embodiments, a sensing system may include a rigid support that may provide a supporting structure for the compliant contact pad and/or multiple sensors associated with the compliant contact pad. The rigid support may be rigid in the sense that, under expected loading conditions, the rigid support may be significantly stiffer than the associated compliant contact pad such that the rigid support experiences negligible (i.e., significantly less) deflection or deformation as compared to deflections or deformations expected of the compliant contact pad during operation. Accordingly, the rigid support may be designed to be more rigid than the compliant contact pad. The stiffness or rigidity of the rigid support may arise from appropriate selection of material and geometric parameters of the rigid support to provide a desired stiffness. The rigid support may be made of metal, plastic, ceramic, or any other suitable material or combination of materials, and may be constructed with an appropriate geometry, to limit deformation under expected loading conditions. Due to its relatively high stiffness, the rigid support may provide protection for the sensors. In some cases, the rigid support may enable simpler interfacing between the sensing system and a larger system to which the sensing system may be mounted, in that the rigid support may make the sensing system self-contained and modular with respect to the larger system. However, embodiments in which the rigid support is integral with the larger system (i.e., the sensing system is not modular) are also contemplated as the disclosure is not so limited.

The currently disclosed sensing systems may be used for any appropriate application where it may be desirable to measure a magnitude, direction, and/or contact location of a force with a system. Specific applications may include, but are not limited to, grasping tasks in which a robotic hand manipulates an object, locomotion tasks where a sensing system is incorporated into a robotic limb, and/or any other appropriate application where it may be desirable to detect a magnitude, direction, and/or contact location of a force applied to a portion of a system.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of one embodiment of a sensing system 100. The sensing system may include a compliant contact pad 102, a rigid support 104, and a computing device 106. Depending on the particular embodiment, the complaint contact pad may either be disposed directly, or indirectly with one or more interposing components, on the rigid support. As discussed below, the compliant contact pad may be associated with multiple sensors that may be electrically connected to the processor. The computing device may be mounted on or within the sensing system, or may be remote from the sensing system. Additionally, depending on the particular embodiment, the computing device may correspond to a processor and associated memory that may store computer processor executable instructions than may be executed by the processor to perform the methods described herein. As detailed further below, the memory may correspond to any suitable non-transitory computer readable medium.

A processor may be configured to determine a magnitude and direction of a force 108 applied to a compliant contact pad 102. Additionally, in some embodiments, the processor may also be configured to determine a contact location 110 of the force applied to the compliant contact pad. For example, a first force may be applied to the compliant contact pad at a first contact location. In response to the first force, the compliant contact pad may deform, yielding a first deformation state. One or more physical parameters associated with this deformation state may be sensed by multiple sensors of the sensing system 100. If a second force is applied to the compliant contact pad at a second contact location, the compliant contact pad may again deform, yielding a second deformation state, where one or more physical parameters associated with this deformation state may similarly be sensed by the multiple sensors. If the first and second forces have different magnitudes, directions, and/or contact locations, the first and second deformation states may be distinct. The processor may use information from the multiple sensors to distinguish between the first and second deformation states, and may consequently determine magnitudes, directions, and/or contact locations of the first and second forces applied to the compliant contact pad.

As also shown in the figure, in some embodiments, such as those in which a contact surface of the environment is planar, a shape of a compliant contact pad 102 may be hemispherical (or otherwise convex) so as to promote point contacts, as discussed above. For example, a sensing system 100 located at a distal portion of a robotic leg may be designed to be hemispherical, as the ground that the leg may contact during operation may reasonably be assumed to be planar. In other embodiments, such as those in which a contact surface of the environment is convex, the shape of the compliant contact pad may be planar. For example, a sensing system located at a distal portion of a robotic finger configured to operate with another robotic finger to grasp spherical objects in a pinch grasp may have a planar shape. Thus, while the shape of the compliant contact pad in FIG. 1 and other figures may be hemispherical, it should be understood that other shapes of the compliant contact pad have been contemplated, and the disclosure is not so limited.

Figure 2:
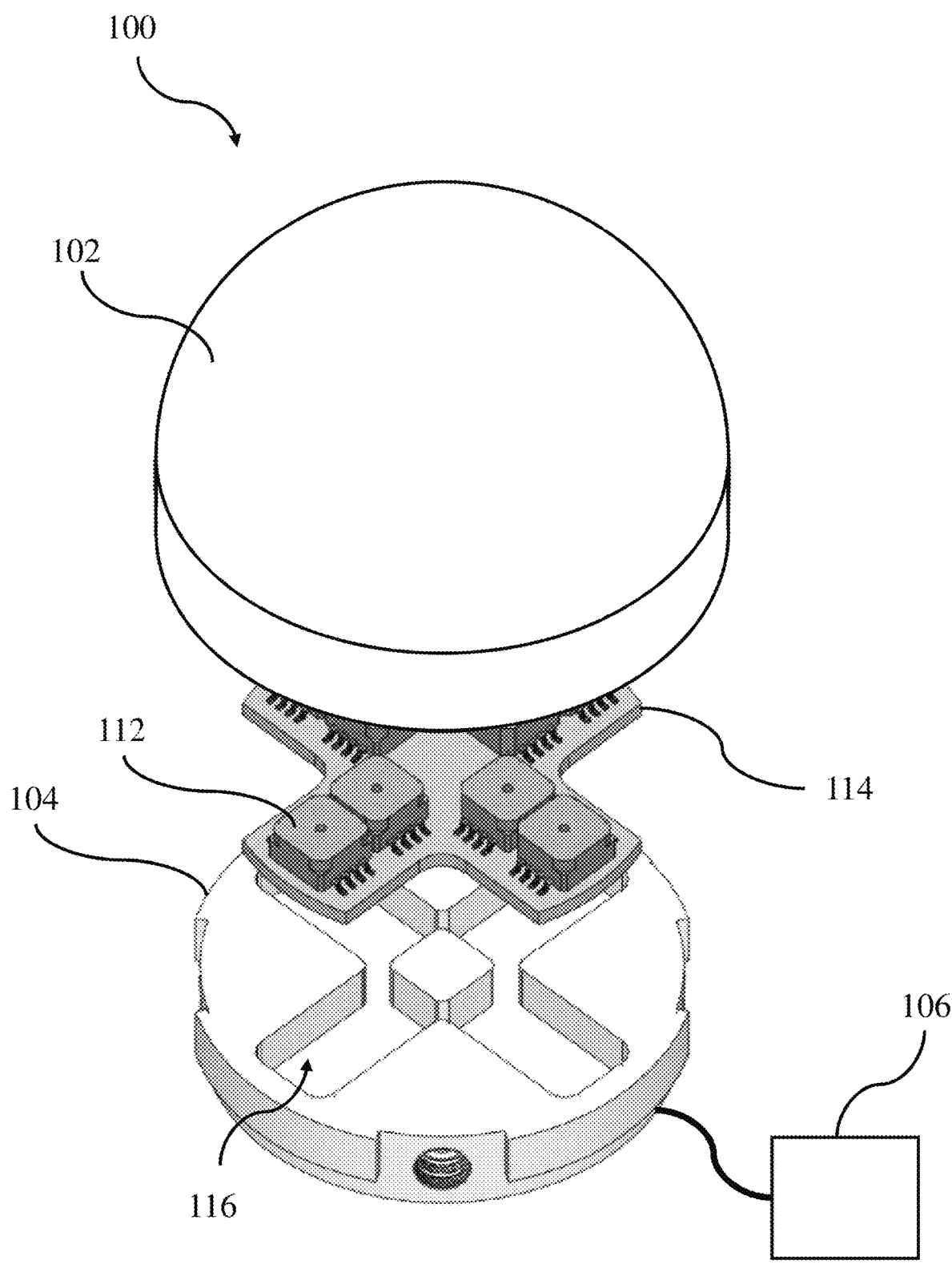
FIG. 2 is an exploded view of the sensing system shown in FIG. 1.

FIG. 2 is an exploded view of the sensing system 100 shown in FIG. 1. In one embodiment, multiple sensors 112 may be disposed between a compliant contact pad 102 and a rigid support 104. The sensors may also be disposed on, or otherwise integrated with, a printed circuit board 114 in some embodiments. The sensors may be in communication with a processor of a computing device 106 which may be configured to receive signals from the plurality of sensors. In the depicted embodiment the sensing system 100 includes eight sensors 112. However, embodiments of a sensing system that include other numbers of sensors are also contemplated. As discussed above, the number of sensors included in a sensing system may be related to the sensing capabilities of the sensing system. Specifically, the number of degrees of freedom of a force applied to the sensing system that may be detected may be constrained by the number of sensors included in the sensing system. Therefore, it should be understood that a sensing system may include any suitable number of sensors based on the number of degrees of freedom that a sensing system is intended to detect as the disclosure is not limited in this regard.

As also shown in the figure, the multiple sensors 112 may be disposed on a printed circuit board 114 and may be arranged in a cross or x-shaped pattern, or any other appropriate arrangement. Thus, in this embodiment, the sensors are disposed at an interface disposed between the compliant contact pad 102 and the rigid support 104. As shown in the figure, in some embodiments, the printed circuit board and/or the sensors are disposed at least partially within one or more cavities 116 formed in the rigid support. This may create an approximately planar interface between the compliant contact pad and the combined sensors and rigid support which may simplify the manufacturing and computational complexity of the disclosed sensing systems. However, the sensors may also be disposed within the compliant contact pad, disposed at least partially within recesses formed in the complaint contact pad, and/or at any other desired location. Additionally, the sensors may be arranged in a different pattern including, but not limited to, a circular pattern, a box pattern, or any other suitable pattern on the circuit board and/or any other appropriate location within the sensing system. In the depicted embodiment, the printed circuit board is disposed against a rigid support 104. However, in some embodiments, a sensor may be disposed directly against a rigid support, and a printed circuit board may not be included. In other embodiments, the sensors may not be confined to a single plane, such as a printed circuit board or a surface of a rigid support, but rather may be distributed throughout a three-dimensional space. In one such embodiment, the sensors may be disposed at various locations within a compliant contact pad 102 as might occur if the sensors were overmolded within the compliant contact pad.

With regard to sensing capabilities, particular positions of the sensors may not be of great importance as long as the sensors are well enough distributed spatially to enable a sufficient sampling of physical parameters associated with a deformation of the compliant contact pad. Practically, certain arrangements of sensors may enable simpler interfacing. For example, confining the sensors to a printed circuit board may permit easier wiring of the sensors. However, it should be understood that the disclosure is not limited to any arrangement of the sensors 112. Thus, the current disclosure includes any appropriate arrangement of sensors relative to a compliant contact pad and/or rigid support as the disclosure is not limited to any particular position, orientation, and/or arrangement of the sensors relative to a compliant contact pad or rigid support. Therefore, the sensors may be disposed in any appropriate arrangement capable of detecting physical parameters associated with a desired deformation of an associated compliant contact pad.

Figure 3A:
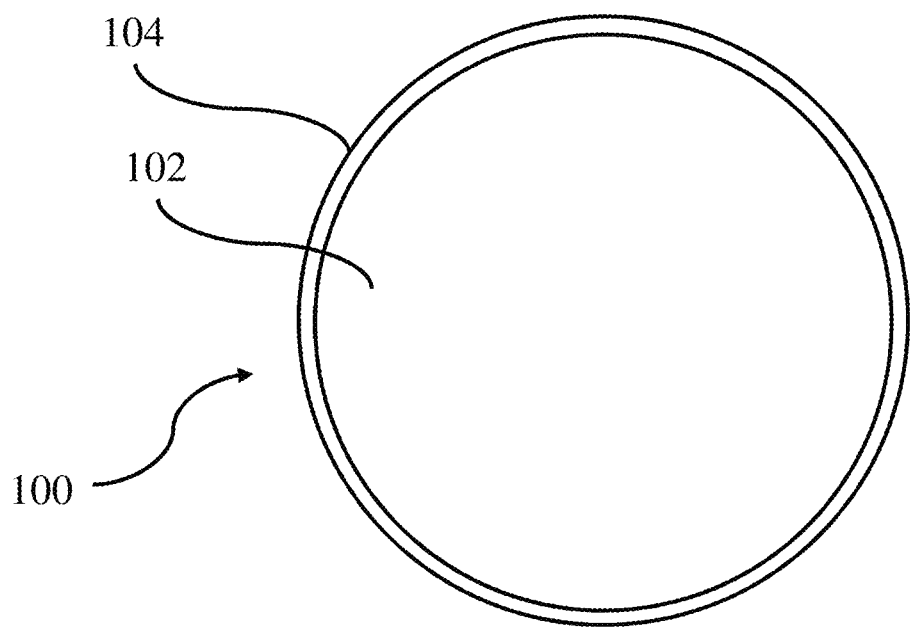
FIG. 3A is a top view of one embodiment of a sensing system.
Figure 3B:
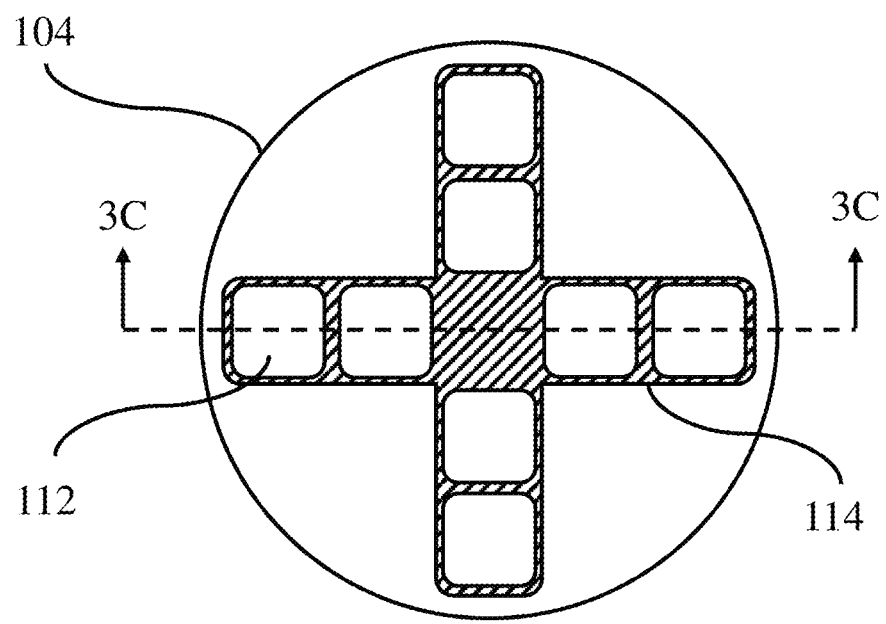
FIG. 3B is a top view of the rigid support of FIG. 3A with an arrangement of sensors disposed therein.
Figure 3C:
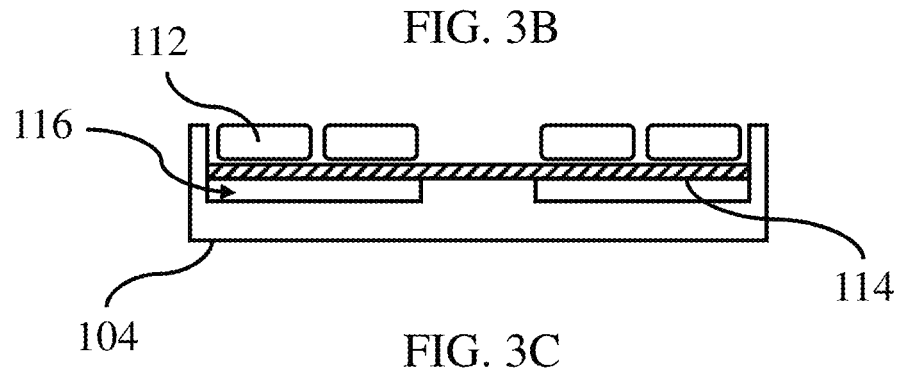
FIG. 3C is a cross sectional side view of the rigid support of the sensing system shown in FIG. 3B.

FIGS. 3A-3C show additional views of various portions of an embodiment of a sensing system 100 similar to that described above. FIG. 3A is a top view of a sensing system including a compliant contact pad 102 and rigid support 104. FIG. 3B is a top view of the sensing system with the compliant contact pad removed, showing a plurality of sensors 112 disposed on a printed circuit board 114. The printed circuit board is disposed on the rigid support 104 at an interface between the rigid support and compliant contact pad. FIG. 3C is a cross sectional side view of the sensing system as shown in FIG. 3B, additionally showing cavities 116 formed in the rigid support in which the plurality of sensors and/or printed circuit board may be at least partially disposed, and in some embodiments, the upper surfaces of the sensors may be arranged such that they are substantially coplanar with a corresponding upper surface, or other supporting surface, of the rigid support which the complaint contact pad is disposed against.

Figure 4:
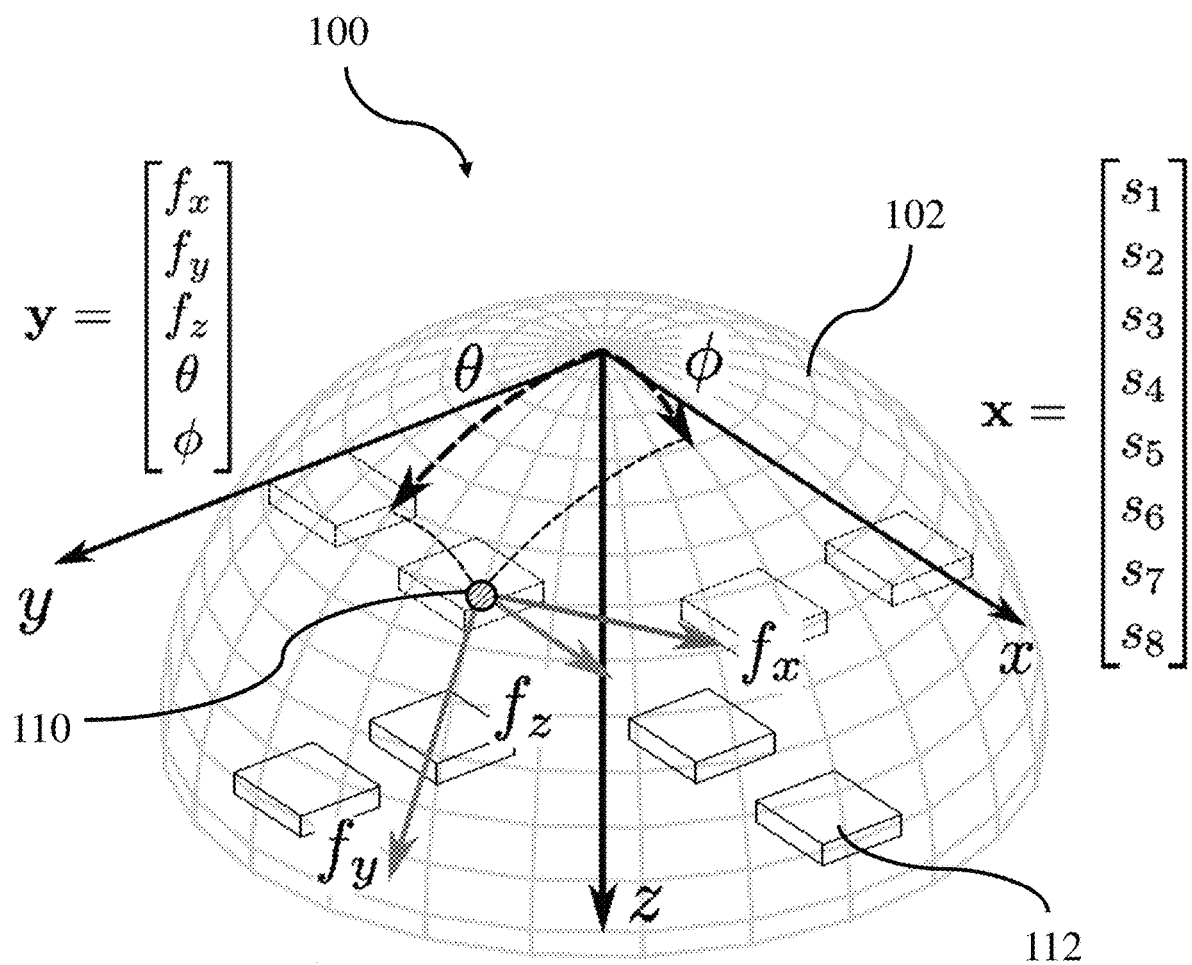
FIG. 4 is a schematic representation of a force being applied to a sensing system.

FIG. 4 is a schematic representation of a force being applied to a sensing system 100. For the purposes of clarity, only a compliant contact pad 102 and a corresponding plurality of sensors 112 are shown in the figure, although it should be understood that other components of a sensing system may be included, as discussed above. As shown in the figure, a force may be applied to a sensing system at a contact location 110. In the embodiment shown in FIG. 4, the sensing system includes a compliant contact pad 102 that is hemispherical. As such, any location on an exterior surface of the contact pad may be described with two polar coordinates, θ and φ. Of course, other contact pad shapes may be better described using Cartesian coordinates, or a combination of polar and Cartesian coordinates. In either case, any location on a two-dimensional surface may be described with two coordinates. For the purposes of discussing FIG. 4, the coordinates may be called θ and φ, but it should be understood that in general each of these coordinates may be polar, Cartesian, or any other suitable type of coordinate used to determine a unique location on a surface.

In the figure, the applied force may have a magnitude and a direction. The magnitude and the direction of the applied force may be understood in terms of components of the applied force along different coordinate axes that may be defined for a given system. Thus, in one embodiment, in three-dimensional space with a defined coordinate system, a force f may have components $f_x$, $f_y$, and $f_z$, along x, y, and z directions, respectively, and which are perpendicular to one another. A person of skill in the art would be able to easily translate between a magnitude/direction representation of a force and a component representation of the force. Thus, for purposes of this disclosure a force decomposed into separate component forces may be viewed as corresponding to a direction and magnitude of the force.

As noted above, a contact location of an applied force may be described with coordinates θ and φ, and a magnitude and a direction of the applied force may be described with components $f_x$, $f_y$, and $f_z$. In some embodiments, the components $f_x$ and $f_y$ may correspond to tangential forces at the contact location, and the component $f_z$ may correspond to a normal force at the contact location. As such, an output vector y may include five variables (i.e., $f_x$, $f_y$, $f_z$, θ and φ) that may fully define the magnitude, direction, and contact location of the applied force.

Still referring to FIG. 4, a sensing system may include a plurality of sensors 112. In the embodiment shown in FIG. 4, there are eight sensors, but it should be understood that any suitable number of sensors may be included, as discussed above. Each of the sensors may produce a signal $s_n$, wherein the subscript n may indicate a particular sensor. As such, an input vector x may include eight variables (i.e., $s_1$, $s_2$, $s_3$, $s_4$, $s_5$, $s_6$, $s_7$, and $s_8$). Of course, an input vector x may have more or fewer variables in embodiments including more or fewer sensors.

As stated above, the number of sensors 112 in a sensing system 100 may be related to the sensing capabilities of the sensing system. In particular, at least N sensors may be used to sense N degrees of freedom of an applied force. If only a magnitude and a direction of an applied force are to be sensed by a sensing system (corresponding to three degrees of freedom), three or more sensors may be included in a system. If a magnitude, direction, and contact location of an applied force are to be sensed by a sensing system (corresponding to five degrees of freedom), five or more sensors may be used. However, as discussed above, additional sensors may be included to provide better resolution while still providing sufficient information for determining a desired number of degrees of freedom of an applied force. In the embodiment shown in FIG. 4, eight sensors are provided to sense five degrees of freedom of the applied force. Of course, other appropriate combinations of numbers of sensors and degrees of freedom of an applied force to be sensed are possible, and the disclosure is not limited in this regard.

Figure 5A:
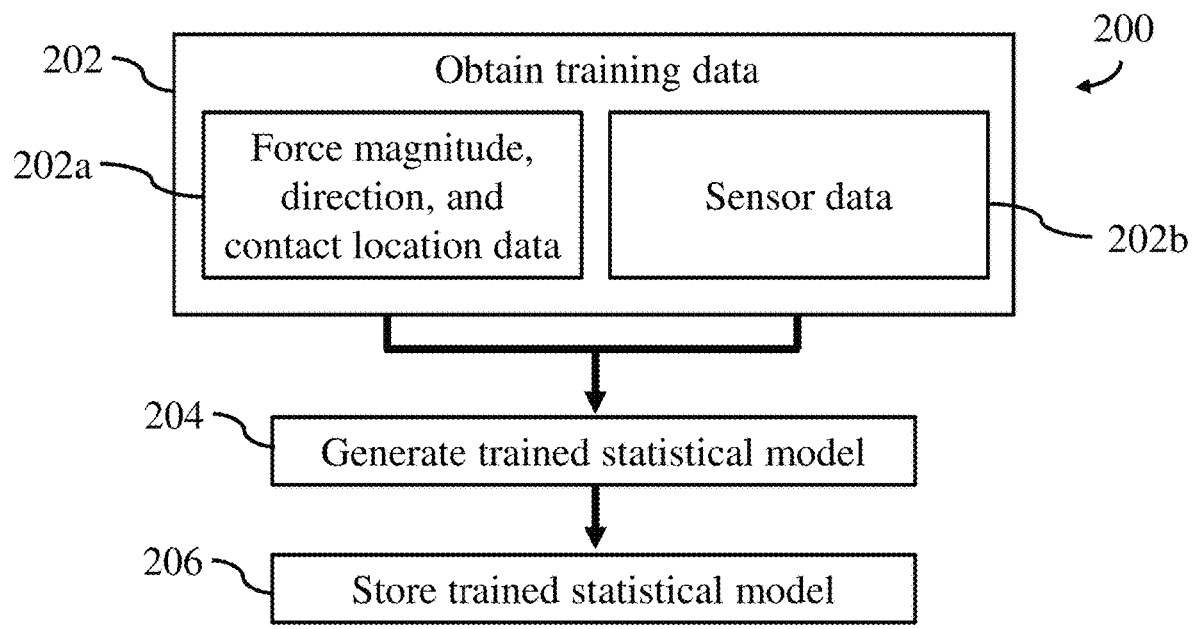
FIG. 5A is one embodiment of a process to generate a trained statistical model.

FIG. 5A is one embodiment of a process 200 that may be used to generate a trained statistical model. At 202, training data may be obtained for use in training a statistical model. The training data may include magnitude, direction, and/or contact location data for a force applied to a compliant contact pad of a sensing system, as shown at 202a. As indicated at 202b, the training data may also include sensor data corresponding to output signals from a plurality of sensors used to detect physical parameters associated with deformation of the compliant contact pad during application of the noted training forces. Referring back to FIG. 4, the sensor data may be understood in terms of an input vector x, and the force data may be understood in terms of an output vector y. Returning to FIG. 5A, after the training data are obtained, a trained statistical model may be generated by inputting the training data into any appropriate statistical model (see 204). The resulting trained statistical model may then be used to determine a relationship between the sensor data (which may be stored in an input vector x) and the force data (which may be stored in an output vector y) for use with the sensing systems disclosed herein. The trained statistical model may be generated by using a regression method, such as Gaussian process regression, a neural network, such as a radial basis function network or a convolutional neural network, or any other appropriate analytical method. Of course, other suitable methods of generating a trained statistical model are possible, as the disclosure is not limited in this regard. Once a trained statistical model has been obtained, the trained statistical model may be stored in a non-transitory computer readable medium for subsequent use as described here (see 206).

Figure 5B:
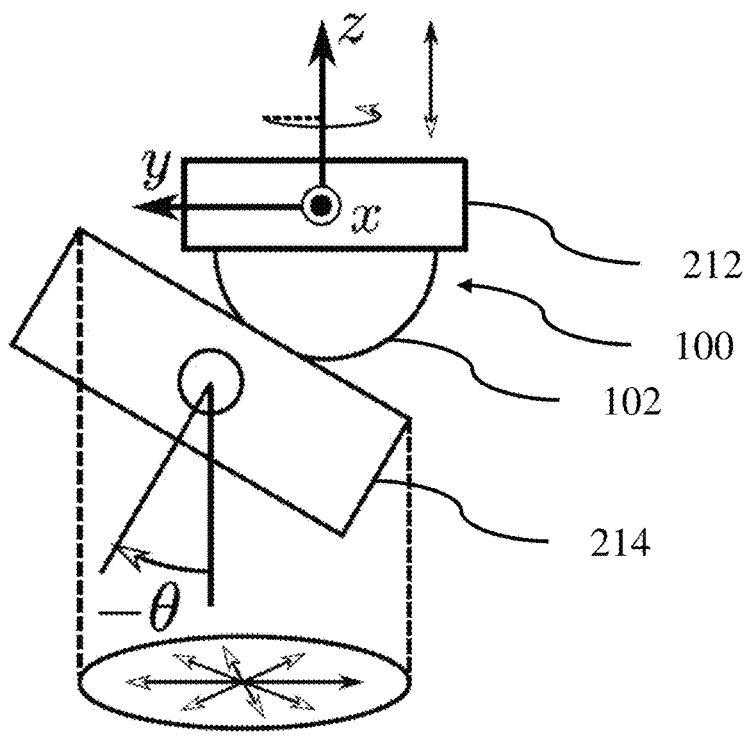
FIG. 5B is a schematic representation of an experimental setup used to obtain training data for use in training a statistical model.

FIG. 5B is a schematic representation of one embodiment of a testing setup that may be used to obtain training data for use in generating a trained statistical model. In the depicted embodiment, a compliant contact pad 102 of a sensing system 100 may be attached to a movable stage 212. The movable stage may be configured to translate along and rotate about a z-axis as defined in FIG. 5B. The compliant contact pad may be contacted by a contact plate 214 that may include a force/torque sensor. The contact plate may be configured to translate in both an x direction and a y direction, as defined by an x-axis and a y-axis as shown in FIG. 5B. Additionally, the contact plate may rotate about an axis parallel to the x-axis, as indicated by the angular variable θ in FIG. 5B. In some embodiments, the contact plate may also rotate about an axis parallel to the y-axis. The force/torque sensor may be configured to detect multi-axis forces and torques applied to the compliant contact pad. The relative positions and orientations of the movable stage and contact plate may be determined with one or more sensors, such as encoders or position sensors. The sensed positions and orientations of the movable stage and the contact plate may be combined with information from the force/torque sensor as well as the geometry of the compliant contact pad to determine a magnitude, direction, and contact location of a force applied to the compliant contact pad. As such, the testing setup may be used to generate a plurality of data points including force and sensed signal information for use as training data that may be used to generate a trained statistical model as discussed above. Of course, while a particular testing setup has been depicted in figures, it should be understood that any appropriate testing setup capable of applying forces to a corresponding compliant contact pad with different magnitudes, different directions, and/or at different locations may be used to obtain the desired training data as the disclosure is not limited to any particular testing setup for generating the training data.

Figure 6:
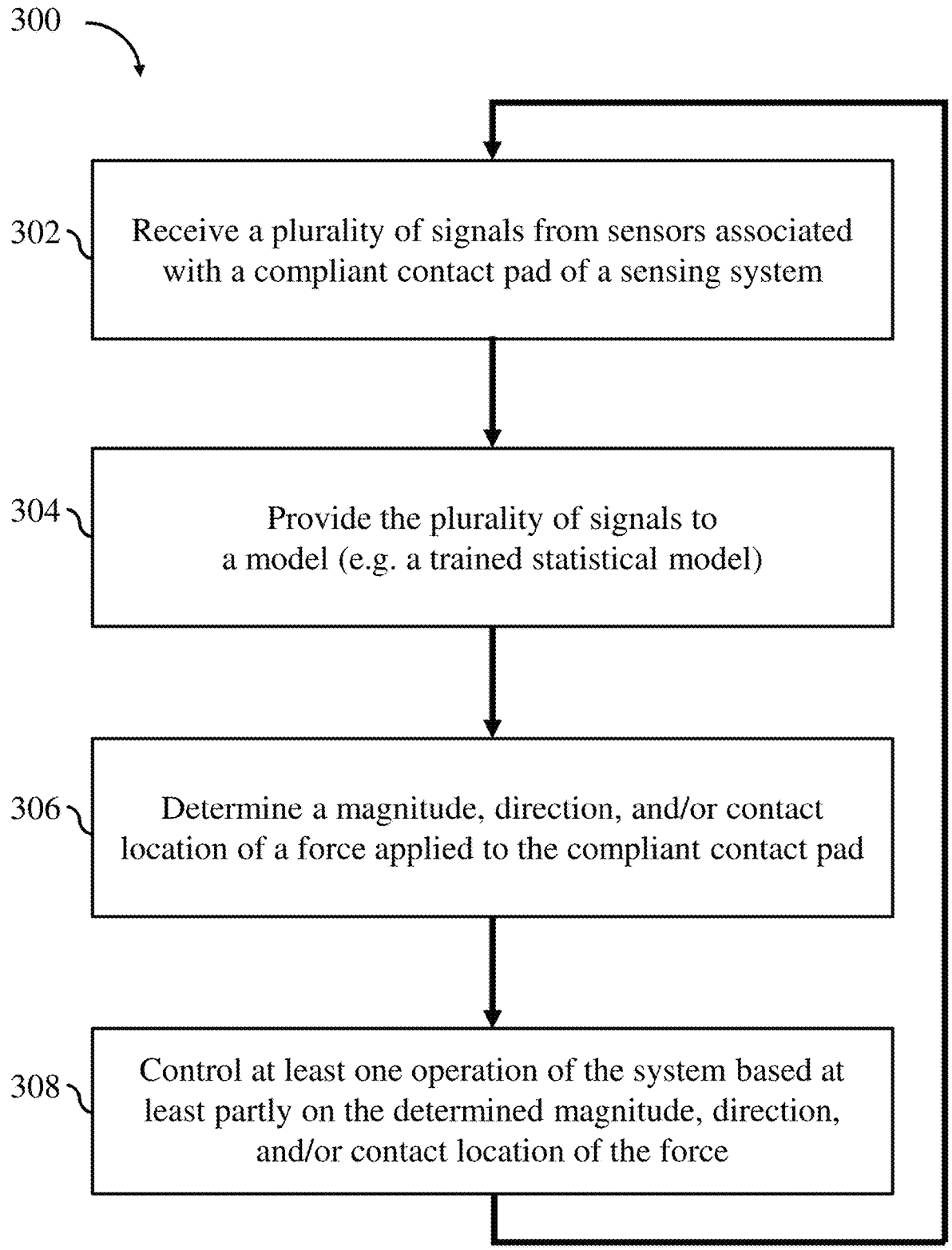
FIG. 6 is a flow diagram of one embodiment of a method of determining a magnitude, direction, and/or contact location of a force applied to a sensing system.

FIG. 6 is a flow diagram of one embodiment of a method 300 of determining a magnitude, direction, and/or contact location of a force applied to a sensing system. In response to the applied force, a compliant contact pad of the sensing system may deform, and a plurality of sensors configured to detect physical parameters associated with deformation of the compliant contact pad may generate a corresponding plurality of signals. At 302, the signals are received. At 304, the signals are output to one or more processors which may provide the signals to a model, such as a trained statistical model, of the compliant contact pad. The model may then output information regarding one, two, or each of, a magnitude, direction, and contact location of the force applied to the complaint contact pad at 306. Based on these outputs from the model, a system associated with the sensing system may be commanded to perform at least one operation based at least partly on the determined magnitude, direction, and/or contact location of the force applied to the complaint contact pad at 308. After the system is operated, a new force may be applied to the sensing system, and the method may repeat.

Figure 7:
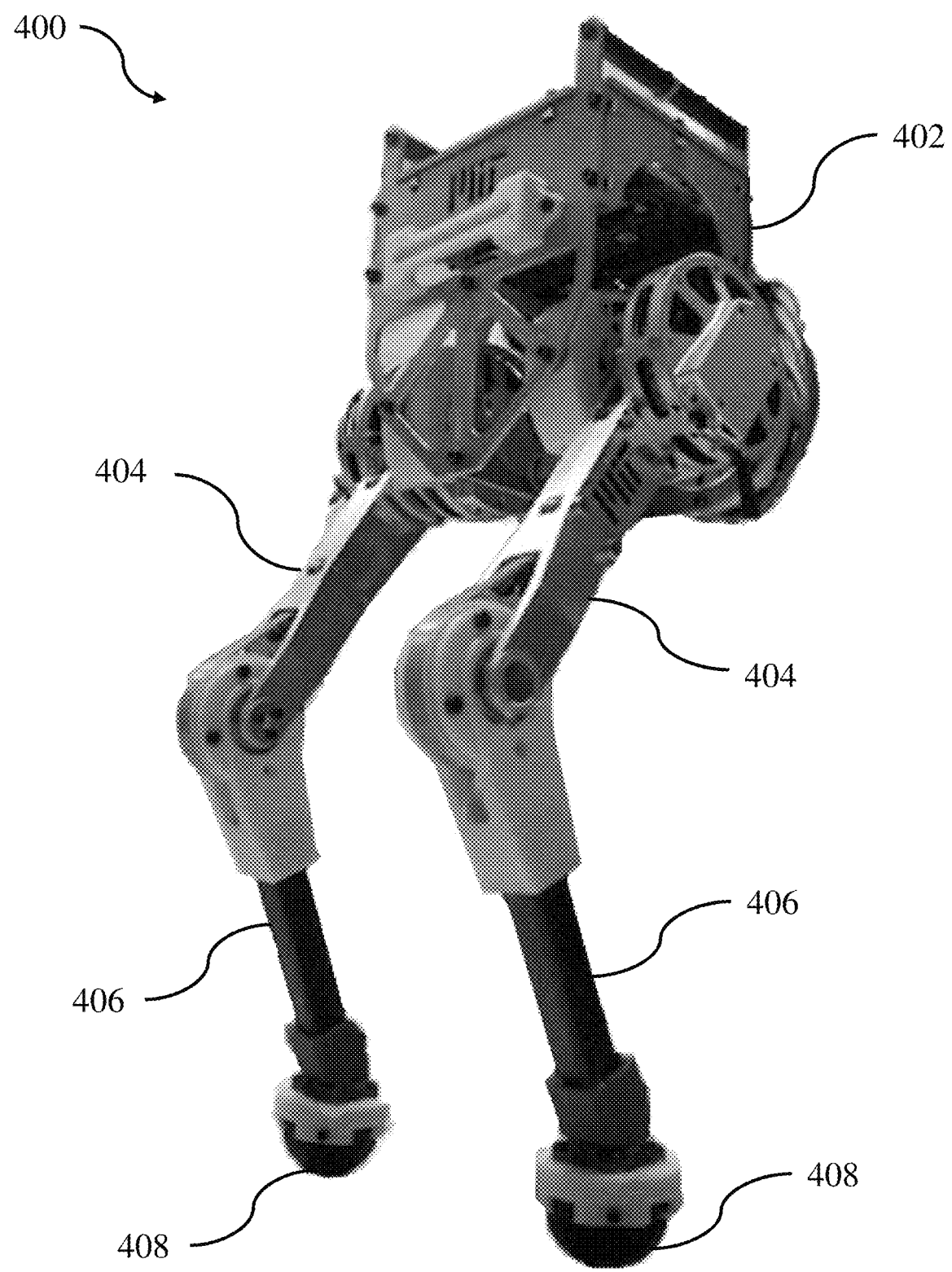
FIG. 7 is a perspective view of one embodiment of a robotic system that includes one or more sensing systems.

FIG. 7 is a perspective view of one embodiment of a robotic system 400 that includes a plurality of sensing systems 408. In the embodiment of FIG. 7, the robotic system is a legged robot that includes a body 402, and two robotic limbs, i.e. legs. Each robotic limb includes an upper leg segment 404 and a lower leg segment 406. A sensing system 408 is disposed on a distal portion of each lower leg segment such that the sensing system forms a foot of the robotic limb which may contact and interact with the surrounding environment. In this embodiment, the sensing systems include compliant contact pads that are hemispherical, which may enable a continuous rolling contact to occur as the legged robot transitions through a step. Information from the sensing systems may provide feedback information about contact force magnitude, direction, and contact location to allow the legged robot, which may be statically unstable, to balance and walk. While a legged robot is shown in FIG. 7, it should be understood that many robotic systems may include the disclosed sensing systems, and the disclosure is not limited to use as a foot of a robotic limb.

Figure 8:
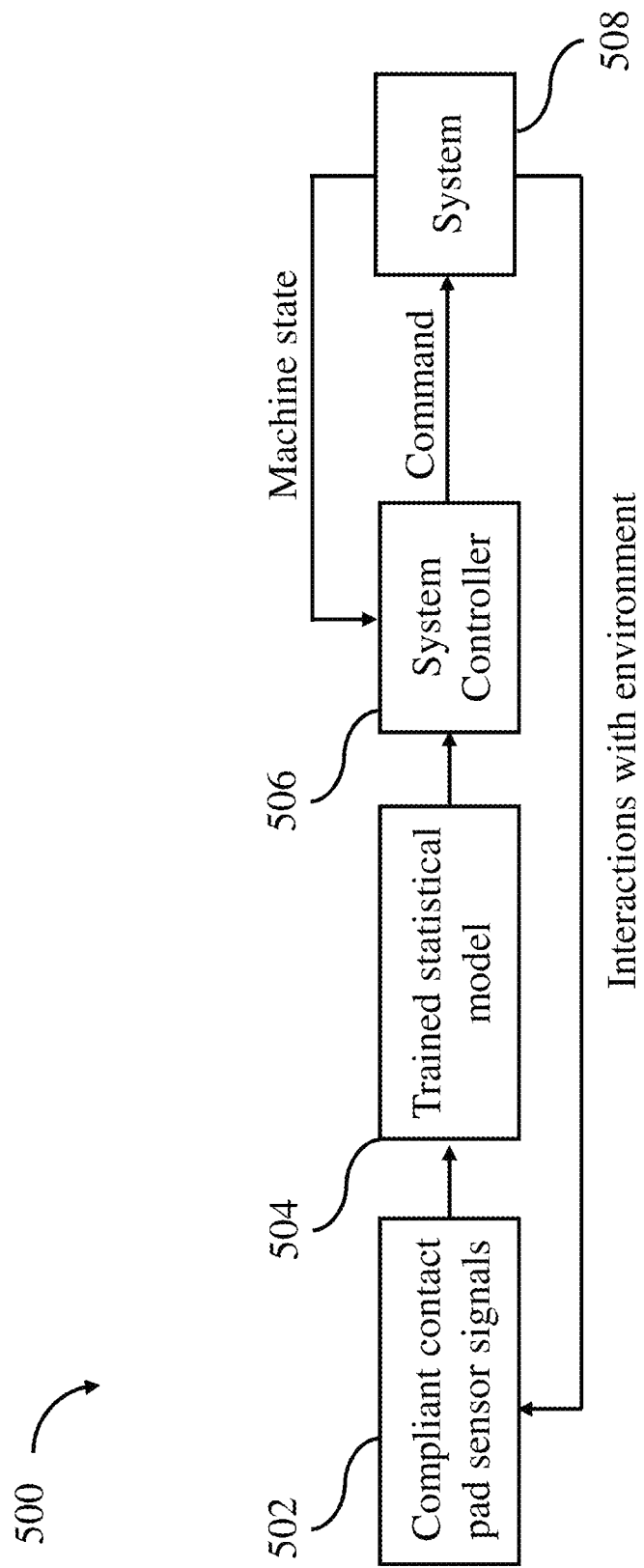
FIG. 8 is a schematic representation of one embodiment of a process that may be implemented by a controller of a system that includes one or more sensing systems.

FIG. 8 is a schematic representation of one embodiment of a control method 500 of a system that includes one or more sensing systems that may be executed by a processor operatively coupled to the described sensing systems as described herein. The method may be implemented in a system similar to the embodiment of a robotic system 400 depicted in FIG. 7, or in any other suitable system, as the disclosure is not so limited. At 502, signals from a plurality of sensors associated with a compliant contact pad of the sensing system may be generated in response to deformation of the compliant contact pad under an applied force. The signals may be output to the processor which may input into the received signals into a trained statistical model, or other appropriate model, at 504. The trained statistical model may output information regarding the magnitude, direction, and/ or contact location of the applied force, as discussed above.

The output of the trained statistical model may be passed to a system controller at 506. The system controller may correspond to the same processor used in obtaining the output force information. However, in some embodiments, the system controller may correspond to a separate processor that receives the force information from the trained statistical model. In either case, the processor of the system controller may be configured to use the output force information from the trained statistical model in combination with information about the current machine state to generate a command that may be sent to one or more components of the system at 508. Upon receiving the command, the one or more components of the system may be operated in the commanded manner. Information about the resulting machine state may be fed back into the system controller for implementing any desired control strategy. Additionally, the new state of the system may cause new forces to be applied to the compliant contact pad, which may cause the sensors to generate new signals, beginning a new iteration of the control loop.

Example: Design and Fabrication of a Sensing System

Eight barometric pressure sensors were modified to act as piezoresistive sensors. An array of eight pressure sensors was chosen in order to decouple x and y shear force from contact location estimation while maintaining sensor symmetry. These piezoresistive sensors were then soldered onto a circular printed circuit board (PCB). The minimum size of the PCB was limited by the size of the pressure sensors, which were chosen for their specific pressure range (20-400 kPa), footprint, calibration, and temperature compensation. However, for other applications in which the observed forces are lower and/or a smaller size sensing system may be desirable, such as in robotic grippers, pressure sensors with a lower maximum pressure and/or a smaller footprint may also be used as the disclosure is not limited to any particular size and/or range of forces.

The sensing elements, which include the PCB and associated electronics, were embedded within a hard plastic layer. This plastic layer with embedded PCB was then overmolded with a hemisphere of translucent polyurethane rubber of Shore A hardness 20. During the rubber molding process, the piezoresistive sensors were coated with the uncured polyurethane rubber and placed into a vacuum chamber to draw out and remove any air bubbles between them and the polyurethane rubber. The liquid polyurethane rubber was then allowed to cure for 16 hours and solidify. This process resulted in a completely monolithic, hemispherical footpad sensing system that was robust, waterproof, and protected from the external environment.

When the rubber of the footpad sensing system contacted the ground and underwent deformation, the stress field within the hemispherical footpad changed. How the stress field varied was determined by the x, y, and z force components, as well as the location of the point at which the hemisphere contacted the ground (determined by angles θ, measured about the x-axis, and φ, measured about the y-axis, as seen in FIG. 4). These changes were detected by the array of piezoresistive sensors. The analog signals from the piezoresistive sensors were passed through a 12-bit analog-to-digital converter which had been integrated onto the PCB, and were then sent to a microcontroller before being used to reconstruct the ground interaction forces and contact location.

Example: Experimental Setup for Data Collection

To correlate the sensor signals from the hemispherical footpad with actual force and ground contact angle readings, a 6-axis force/torque sensor and a rotary magnetic encoder were used as the ground truth. A 3-axis CNC milling machine was altered to allow mounting of the footpad sensing system and to incorporate a fourth rotary with a trunnion table to perform roll about the x-axis of the mill. A manual rotation stage was also added to the CNC mill in order to rotate the footpad about the z-axis of the mill. The CNC mill was then programmed to act as a positioner to bring the footpad sensing system into contact with the force/torque sensor and move it through a set trajectory. FIG. 5B shows a schematic of the experimental setup with the CNC mill pressing the footpad sensing system onto the force/torque sensor.

Data were collected for contact points across ⅛ of the hemisphere surface using rotation about the x-axis from 0° to 40° spaced at 10° increments, and rotation about the z-axis from 0° to 45° spaced at 15° increments. This corresponded to contact locations in the range θ=0° to θ=45° and φ=0° to φ=30.68° where θ and φ were sequential explicit rotations about x and y-axis, respectively, as seen in FIG. 4. Forces were defined in the sensing system coordinate systems such that $f_x$ and $f_y$ were tangent to the rubber hemisphere surface (shear forces) and $f_z$ was normal to the rubber hemisphere surface (normal force).

At each contact location, the sensor was moved through an asterisk shaped path normal to the surface of the force/torque sensor at various levels of compression. These data were then separated into two groups, including a group of data to be used for training and a group of data to be used for testing or validation. While data were only collected for contact points covering ⅛ of the hemisphere surface, the results may be applicable to the whole hemisphere due to the symmetry of the sensing system.

During the motion of the trajectories, 12-bit analog voltages from the piezoresistive sensors embedded in the hemispherical footpad and from the rotary encoder were read by a microcontroller at a 1 kHz sampling rate. At the same time, the forces in the normal and shear directions of the force/torque sensor were collected through a data acquisition system at 1 kHz as well. Voltages from the footpad and encoder, and the forces from the force/torque sensor were all synchronized before being exported as data sets for further processing.

Example: Gaussian Process Regression

The relationship between the eight pressure sensor readings and the contact force and angle was too complex to be analytically modeled. Instead, Gaussian process regression (GPR) was used to find a mapping between sensor signals and output signals and provide reliable force and angle estimation. FIG. 4 summarizes the input and output data used in the estimation. The input vector, x, was composed of the voltage signals from the eight pressure sensors, $[s_1, s_2, \ldots, s_8]^T$. The output vector, y, consisted of the contact location, described by angles θ and φ, and the linear force at that location, $[f_x, f_y, f_z]^T$. The GPR was first trained using a training data set, then evaluated using a validation data set.

Using GPR, an estimation of the scalar output $\hat{y}_j$ (e.g., estimated $f_x$, $f_y$, $f_z$, θ, or φ) for any new vector input (e.g., $[s_1, s_2, s_2, \ldots, s_8]^T$) can be calculated using the equation:

$$\hat{y}_j = k_*(K - \sigma_n I)^{-1} y_j \qquad (1)$$

where $y_j$ is an n×1 vector consisting of the measured value of the output being estimated for each point in the training data set of n points, K is the covariance matrix, and $\sigma_n$ is the standard deviation. The training data set had n=5,649 points. Because ŷ is a scalar output, the computation in Eq. (1) may be completed five times on each input in order to provide a full output estimation vector y including estimated $f_x$, $f_y$, $f_z$, θ, and φ. k, and K were calculated as follows:

$$k_* = [\, k(x_*, x_1) \quad k(x_*, x_2) \quad \ldots \quad k(x_*, x_n) \,] \qquad (2)$$

$$K = \begin{bmatrix} k(x_1, x_1) & k(x_1, x_2) & \ldots & k(x_1, x_n) \\ \vdots & \vdots & \ddots & \vdots \\ k(x_n, x_1) & k(x_n, x_2) & \ldots & k(x_n, x_n) \end{bmatrix} \qquad (3)$$

Note that all terms in Eq. (1) except k, are independent of the new input x*. This means that although the computation of $(K - \sigma_n I)^{-1} y_j$ required high computational effort due to the matrix inversion, a complete estimation given new input data took less than 1 ms after the system had been trained. On a Ryzen Threadripper 1950X 4 GHz CPU the average computation time of the estimation was 0.3 ms.

When calculating K, a squared-exponential covariance function was used as the kernel k:

$$k(x_1, x_2) = \sigma_f^2 \exp\left(-\frac{1}{2l^2} \|x_1 - x_2\|^2\right) \qquad (4)$$

where $\sigma_f$ and l represent signal variance and length-scale, respectively. The hyperparameters, $\sigma_n$, $\sigma_f$ and l were optimized by evaluating the result of the regression using the validation data set.

After the force and sensor data were collected for multiple contact locations and compression amounts, as discussed above, these data were divided into a training data set and a validation data set. 1 out of every 1000 data points was used for the training data set, while 1 out of every 10 data points was used for the validation data set. The training data set was used to train GPR, while the validation data set was used to validate the fit. The root mean squared (RMS) error and coefficient of determination $R^2$ between the Gaussian process force estimators and the measured forces for the validation data set are shown in Table I as a way to evaluate the goodness of fit of the estimator. Table I shows that there was a good agreement between the estimated and measured forces and angles.

TABLE I

|   | RMS Error (N) | Norm. RMS Error (%) | $R^2$ (%) |
|---|---|---|---|
| $f_x$ | 1.537 | 1.709 | 98.126 |
| $f_y$ | 2.259 | 1.824 | 96.491 |
| $f_z$ | 1.870 | 1.001 | 99.704 |
| θ | 0.019 | 2.689 | 99.065 |
| φ | 0.0149 | 2.790 | 99.123 |

$$\text{RMS Error} = \left[\frac{1}{n}\sum_{i=1}^{n}(\hat{y}_i - y_i)^2\right]^{1/2} \qquad (5)$$

$$R^2 = \left[1 - \frac{\sum_{i=1}^{n}(y_i - \hat{y}_i)^2}{\sum_{i=1}^{n}(y_i - \bar{y})^2}\right] \times 100\% \qquad (6)$$

Example: Experimental Validation

The first set of additional tests was intended to reflect the "rolling" contact the footpad may experience during walking, and to test the ability of the sensing system to determine contact location while experiencing both normal and shear forces. These tests consisted of compressing the footpad sensing system a set amount (2 mm), then using the trunnion table of the CNC mill to roll along the footpad surface between 0° and 25° at a fixed rotation about the z-axis. This was repeated for z-axis rotations of 0°, 10°, 20°, and 30°. Table II shows that there was generally a good agreement between the measured and estimated forces and angles. One exception to this trend was the $f_x$ data, due to the very low $f_x$ observed during trials in which the mill was rolling about the x-axis. The magnitude of the estimated $f_x$ was comparable to the magnitude of noise in the force/torque sensor data. The lower $R^2$ value for the $f_y$ data is also likely due to a large amount of noise in the force/torque sensor data, relative to the measured $f_y$.

TABLE II

|   | RMS Error (N) | Norm. RMS Error (%) | $R^2$ (%) |
|---|---|---|---|
| $f_x$ | 1.424 | 22.226 | −219.569 |
| $f_y$ | 2.300 | 6.685 | 84.445 |
| $f_z$ | 1.474 | 1.327 | 99.587 |
| θ | 0.033 | 7.509 | 92.936 |
| φ | 0.022 | 9.617 | 85.876 |

The second set of additional tests was performed by manually manipulating the footpad sensing system through a range of different motions against the surface of the force/torque sensor to create a random input of contact locations, shear, and normal forces over time. The contact locations tested were intentionally kept within or near the ⅛ hemisphere surface on which the system had been previously trained. Table III shows that there was a good agreement between the estimated and measured forces. The quality of the angular estimation could not be quantified as there was no reference contact location for comparison in the handheld tests. Due to the accuracy limits of manual human positioning, there may have been a small mismatch between the coordinate frames of the footpad and the force/torque sensor.

TABLE III

|   | RMS Error (N) | Norm. RMS Error (%) | $R^2$ (%) |
|---|---|---|---|
| $f_x$ | 1.450 | 4.674 | 92.609 |
| $f_y$ | 2.5597 | 6.167 | 90.618 |
| $f_z$ | 0.725 | 1.365 | 99.454 |

To give a qualitative measure of the durability of the footpad sensing system, impact and high force compression tests were also conducted. For the impact test, the footpad was first manually compressed to demonstrate normal sensor functionality. The footpad was then struck repeatedly with a hammer, causing the individual pressure sensor readings to saturate. Following this, the footpad sensing system was tested again to ensure that it was still functioning. In the compression test, the sensor was compressed on the mill at a contact location of θ=0° and φ=0° to a force of above 450N without saturating.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device, such as a controller, may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, an integrated circuit included in a system, or any other suitable portable or fixed electronic device.

A computing device may also have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs corresponding to processor executable instructions, that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A sensing system comprising:
a compliant contact pad configured to contact an environment;
a plurality of sensors coupled to the compliant contact pad, wherein the plurality of sensors are configured to detect a physical parameter indicative of deformation of the compliant contact pad, and
a processor configured to receive signals from the plurality of sensors, wherein the processor is configured to determine a magnitude and direction of a force applied to the compliant contact pad with the signals from the plurality of sensors.

2. The sensing system of claim 1, wherein the processor is configured to determine a contact location of the force applied to the compliant contact pad with the signals from the plurality of sensors.

3. The sensing system of claim 1, wherein the plurality of sensors is at least three sensors.

4. The sensing system of claim 1, wherein the plurality of sensors is at least five sensors.

5. The sensing system of claim 1, wherein an exterior surface of the compliant contact pad is hemispherical or convex.

6. The sensing system of claim 1, wherein the compliant contact pad is an elastomer.

7. The sensing system of claim 1, wherein the plurality of sensors include at least one selected from the group of force sensors, pressure sensors, torque sensors, strain gauges, and displacement sensors.

8. The sensing system of claim 1, further comprising a rigid support, wherein the compliant contact pad is disposed against the rigid support.

9. The sensing system of claim 8, wherein the plurality of sensors are disposed between the compliant contact pad and the rigid support.

10. The sensing system of claim 8, wherein the plurality of sensors are disposed in cavities formed in the rigid support.

11. A system comprising:
the sensing system of claim 1,
wherein the processor is configured to determine a contact location of the force against the compliant contact pad with the signals from the plurality of sensors, wherein the processor is configured to control at least one operation of the system based at least partly on the determined magnitude, direction, and/or contact location of the force.

12. The system of claim 11, wherein the system comprises at least one selected from the group of a robotic limb and a robotic hand.

13. The system of claim 11, wherein the sensing system is disposed on a distal portion of a robotic limb segment of the system.

14. A method comprising:
applying a force to a compliant contact pad;
receiving signals from a plurality of sensors configured to detect a physical parameter indicative of deformation of the compliant contact pad; and
providing the signals to a trained statistical model of the compliant contact pad and obtaining a corresponding output including a magnitude and direction of the force applied to the compliant contact pad.

15. The method of claim 14, further comprising controlling at least one operation of a system based at least partly on the output magnitude and direction of the force.

16. The method of claim 14, wherein the output includes a contact location of the force applied to the compliant contact pad.

17. The method of claim 14, wherein the plurality of sensors are configured to detect a stress state of the compliant contact pad.

18. The method of claim 14, wherein the plurality of sensors are configured to detect a strain state of the compliant contact pad.

19. A method comprising:
obtaining training data, wherein the training data include magnitude, direction, and contact location data for forces applied to a compliant contact pad, and wherein the training data includes sensor data from a plurality of sensors configured to detect a physical parameter indicative of deformation of the compliant contact pad when the forces are applied to the compliant contact pad;

generating a trained statistical model using the training data; and storing the trained statistical model in a non-transitory computer readable medium for subsequent use.

20. The method of claim 19, wherein generating the trained statistical model includes using regression.

21. The method of claim 20, wherein using regression includes using Gaussian process regression.

22. The method of claim 19, wherein generating the trained statistical model includes using a neural network.

* * * * *